United States Patent
Cattrone

(10) Patent No.: US 7,478,746 B2
(45) Date of Patent: Jan. 20, 2009

(54) TWO-DIMENSIONAL COLOR BARCODE AND METHOD OF GENERATING AND DECODING THE SAME

(75) Inventor: Paul Cattrone, Pleasant Hill, CA (US)

(73) Assignee: Konica Minolta Systems Laboratory, Inc., Foster City, CA (US)

(*) Notice: Subject to any disclaimer, the term of this patent is extended or adjusted under 35 U.S.C. 154(b) by 436 days.

(21) Appl. No.: 11/444,288

(22) Filed: May 31, 2006

(65) Prior Publication Data

US 2007/0278303 A1 Dec. 6, 2007

(51) Int. Cl.
G06K 7/10 (2006.01)
(52) U.S. Cl. ............... 235/10; 235/462.04; 235/462.08; 235/494
(58) Field of Classification Search ............ 235/462.01, 235/462.04, 462.08, 462.09, 494
See application file for complete search history.

(56) References Cited

U.S. PATENT DOCUMENTS 6,070,805 A 6/2000 Kaufman et al.
7,032,823 B2* 4/2006 Nojiri .................... 235/462.09
2004/0020989 A1* 2/2004 Muramatsu .............. 235/462.1
2005/0284944 A1 12/2005 Ming

OTHER PUBLICATIONS

In "BarCode-1, 2-Dimension Bar Code Page", website: http://www.adams1.com/pub/russadam/stack.html, 11 pages, printed from the Internet on Aug. 7, 2006.

* cited by examiner

Primary Examiner—Seung H Lee
(74) Attorney, Agent, or Firm—Chen Yoshimura LLP

(57) ABSTRACT

A two-dimensional color barcode using gradations of color is disclosed. The barcode includes a black and white configuration block that encodes configuration information about the barcode and a plurality of color data blocks that encodes data. Each tile in the data blocks has one of the-predefined recoverable gradation values of the RGB, CMY or other color sets. The number of recoverable gradation values for each color used in the color data block is specified in the configuration block. The barcode also includes a corner marker consist of a column and a row of black abutting the configuration block which is located in the top left corner, three additional corner markers and a plurality of block separators along the sides of barcode. Also described are methods for generating and decoding such a 2d color barcode. The methods include transforming data values to be encoded into the color space and vise versa.

28 Claims, 3 Drawing Sheets

Bottom Left Corner 13d

Bottom Right Corner 13c

Top Right Corner 13b

Block Separators 14b

Block Separators 14a

TWO-DIMENSIONAL COLOR BARCODE AND METHOD OF GENERATING AND DECODING THE SAME

BACKGROUND OF THE INVENTION

1. Field of the Invention

This invention relates to color barcodes, and in particular, it relates to a two-dimensional color barcode and methods for generating and decoding such two-dimensional color barcodes.

2. Description of the Related Art

Barcodes are a form of machine-readable symbology for recording digital information. One-dimensional and two-dimensional black and white barcodes have been widely used. Many barcode formats have been developed, some examples of which are described in "BarCode-1, 2-Dimension Bar Code Page", http://www.adams1.com/pub/russadam/stack.html. To increase data capacity, two dimensional color barcodes have been proposed, which use color to represent information. For example, U.S. Pat. No. 6,070,805 describes a distortion-resistant color barcode symbology that uses two sets of colors (red, green, and blue, and cyan, magenta and yellow). In another example, commonly owned U.S. Patent Application Publication 2005/0284944 A1 entitled "Color barcode producing, reading and/or reproducing method and apparatus" describes using six colors (red, orange, blue, green, yellow and pink) in a color barcode.

SUMMARY OF THE INVENTION

An object of the present invention is to provide a method for enhancing the capacity and recoverability of two-dimensional (2d) color barcode.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other objects, as embodied and broadly described, the present invention provides a two-dimensional color barcode, which includes a configuration block containing a plurality of black and white tiles, and at least one data block containing a plurality of color tiles, each color tile having a color gradation value representing a data value, the color gradation value being one of a plurality of pre-defined recoverable color gradation values. The configuration block encodes configuration information for the two-dimensional color barcode, the configuration information specifying the recoverable color gradation values used in the color tiles of the data block.

In another aspect, the present invention provides a method for generating a two-dimensional color barcode, which includes: (a) obtaining input data to be encoded in the two-dimensional color barcode; (b) obtaining configuration information specifying recoverable color gradation values for a plurality of colors to be used in the color barcode; (c) rendering a configuration block containing a plurality of black and white tiles, the configuration block encoding configuration information specifying the recoverable color gradation values; and (d) rendering at least one data block containing a plurality of color tiles, each color tile having a color gradation value representing a data value, the color gradation value being one of a plurality of the recoverable color gradation values.

In yet another aspect, the present invention provides a method for decoding a two-dimensional color barcode. The barcode comprising a configuration block containing a plurality of black and white tiles and at least one data block containing a plurality of color tiles, each color tile having a color gradation value representing a data value, the color gradation value being one of a plurality of pre-defined recoverable color gradation values, wherein the configuration block encodes configuration information for the two-dimensional color barcode, the configuration information specifying the recoverable color gradation values used in the color tiles of the data block, the configuration information further specifying a number of data blocks in a horizontal direction and a number of data blocks in a vertical direction of the barcode. The method includes: (a) isolating the configuration block and extract configuration information from the configuration block; (b) based on the configuration information, dividing the barcode into a plurality of data blocks; and (c) based on the configuration information, determine color gradation values of the color tiles of the data blocks and decoding the color gradation values to obtain data encoded in the data blocks.

The present invention is also directed to computer program products that cause a data processing apparatus to perform related barcode generation and decoding.

It is to be understood that both the foregoing general description and the following detailed description are exemplary and explanatory and are intended to provide further explanation of the invention as claimed.

BRIEF DESCRIPTION OF THE DRAWINGS

FIGS. 1(a)-(e) illustrate an example of a 2d color barcode according to an embodiment of the present invention.

DETAILED DESCRIPTION OF THE PREFERRED EMBODIMENTS

According to an embodiment of the present invention, to adequately read and decode 2d color barcodes, a configuration block in the form of a black and white barcode block is included in the 2d color barcode to specify configuration information of the 2d color barcode.

Figure 1A:
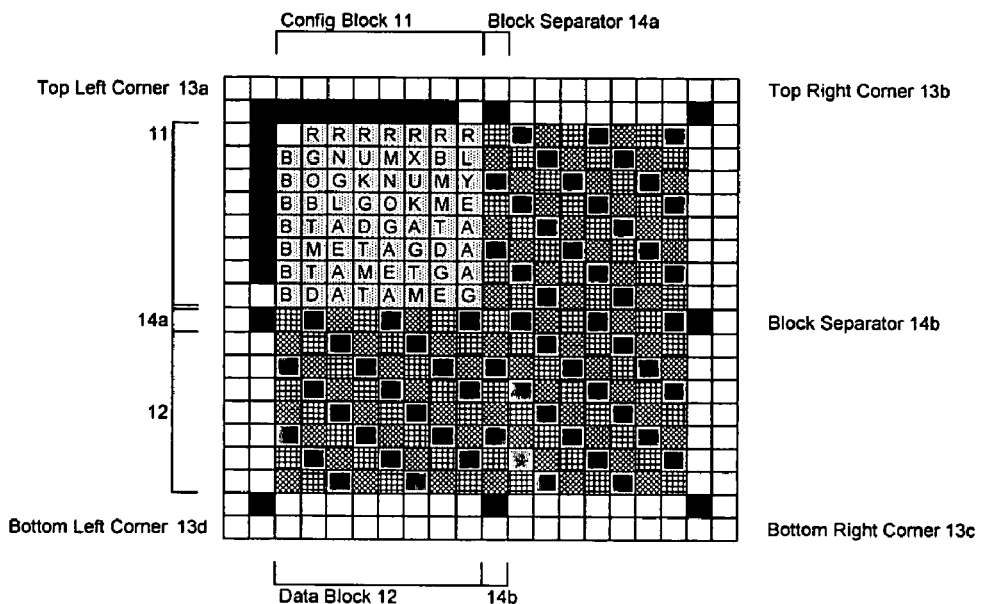
Figure 1A:
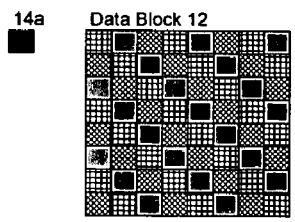
Figure 1A:
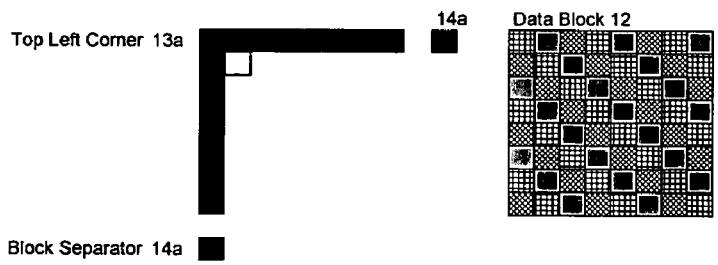
Figure 1D:
Figure 1D:
Figure 1D:
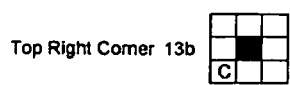
Figure 1E:
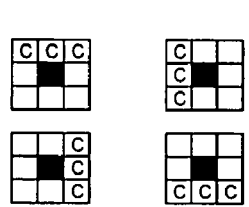
Figure 1E:

FIGS. 1(a)-(e) illustrate an example of a 2d color barcode and its format specifications. As shown in FIG. 1(a), a black and white configuration block 11 is preferably located in the top left corner of the 2d color barcode 10. The remainder of the 2d color barcode 10 includes a number of data blocks 12 which are color barcode blocks (see also FIG. 1(b)). The configuration block and the data blocks are preferably of the same size. In the illustrated example, the configuration block 11 and data block 12 each has 8×8 tiles. The tiles in the configuration block 11 are black or white, whereas the tiles in data blocks 12 are gradations of red (R), green (G) or blue (B) or combinations of gradations of R, G and B. Alternatively, the tiles in the data block may be gradations of cyan (C), magenta (M) or yellow (Y) or combinations of gradations of C, M and Y. Gradations of gray may also be used in the data block together with either RGB or CMY colors. Other suitable color sets may also be used. Each color gradation value (including gray) represents a data value.

As described in commonly owned, co-pending U.S. patent application entitled "Color Barcode with Enhanced Capacity and Readability for a Closed Loop System" Ser. No. 11/363,960 various hardware factors limit the data capacity and readability of color barcodes. For example, even if a printer can nominally print 8-bit color data per color (i.e. 256 color gradation levels), a scanner usually cannot accurately measure 256 shades of a color printed by a printer. That co-pending patent application describes a method for detecting the color rendering and reading capabilities of a printer and a scanner used in a closed loop system and to provide a color barcode having a maximum number of recoverable color gradation values for the given printer/scanner pair in order to maximize the data capacity and readability of the barcode. When a barcode is intended for use with a variety of printer models and scanner models, the number of color gradation values that can be reliably rendered and read back will be more limited.

In embodiments of the present invention, a pre-determined number of recoverable color gradation values for each color are used for the tiles of the data block, and the number may be different for different colors. For example, if 4 recoverable gradations of red are used, the barcode encoder will render red tiles having one of the 4 recoverable gradation values. When the rendered tiles are printed and then scanned, the scanned color gradation values for the tiles will likely deviate from the rendered values, but will fall within a range in the vicinity of each rendered color gradation value. Thus, knowledge of the recoverable gradation values allows the color gradation values encoded in the tiles to be accurately recovered. The number of possible data values represented by each tile (i.e. the data capacity of a tile) is the sum of the number of recoverable gradation values of all colors. For example, if R, G and B colors are used (i.e. no combination of the colors), and the colors have 4, 5 and 6 recoverable gradation values (excluding white), respectively, then each tile will represent 16 possible values (including white), or 4 bits of data. The actual number of gradations that can be reliably rendered and recovered will depend on hardware factors, but a sufficiently low number of recoverable gradation values will ensure that the color barcode can be used by most printers and scanners.

Referring again to FIGS. 1(a)-(e), the boundaries of the 2d color barcode 10 are defined by a number of corner markers 13a-d and block separators 14a-b. As shown in FIGS. 1(a) and 1(c), the top left corner marker 13a consists of a column and a row of black tiles abutting the configuration block from the left and above. Each of the other three corner markers 13b-d consists of one black tile located at a corner of the color barcode 10. The top left corner marker is a special corner marker as it is different from the other three. A number of block separators 14a and 14b, each consisting of a black tile, are provided along the four sides of the 2d barcode 10 between the corner markers and are spaced apart by the length of a data block. The block separators located along the horizontal sides are aligned with the left-most column of the data blocks and the block separators located along the vertical sides are aligned with the top row of the data blocks. In the example shown in FIGS. 1(a) and 1(c), the column and the row of black tiles in the top left corner marker 13a extends downwards and to the left such that they are separated from the adjacent block separator 14a by one white tile. This means that the length of the column and row of black tiles is the same as the size of the configuration block (and the data block). A white space (a border) having a width at least the size of one tile is provided around the barcode 10 outside of the corner markers 13a-d and the block separators 14a-b.

When a barcode decoder reads the 2d color barcode 10, the top left corner marker 13a can be recognized by searching for a pre-defined pattern of column and row of black tiles such as the pattern shown in FIG. 1(a). The pre-defined tile pattern may optionally include the block separators 14a adjacent the top left corner marker (see FIG. 1(c)). In addition, the configuration block may be designed such that the top left tile in the configuration block is white, and this white tile may optionally be a part of the pre-defined pattern that defines the top left corner marker 13a (see FIG. 1(c)). The other three corner markers 13b-d are recognized by searching for tile patterns shown in FIG. 1(d), in which the black square represents the corner marker tile, the squares labeled with a "C" represent color tiles, and the rest of the tiles around the black tile are white. The block separators can be recognized by searching for patterns shown in FIG. 1(e), in which the black square represents the block separator tile, the squares labeled with a "C" represent color tiles, the squares labeled with a "B" represent black or white tiles, and the rest of the tiles around the black tile are white. Note that each of the two block separators 14a located near the top left corner marker 13a has two adjacent color tiles and one adjacent black or white tile; each of the block separators 14b located further away from the top left corner marker 13a has three adjacent color tiles.

The tile size (i.e. length in X and Y directions) and the number of tiles per block may be pre-defined values known to the decoder (e.g., 0.01"×0.015" per tile, 8×8 tiles per block). Alternatively, the tile size and/or the number of tiles per block may be obtained by analyzing the pattern of the top left corner marker 13a. For example, the width of the column of black tiles in the top left corner marker is equal to the tile width, and the height of the row of black tiles is equal to the tile height. The height of the column of black tiles divided by the tile height is equal to the number of tiles per block in the Y direction, and width of the row of black tiles divided by the tile width is equal to the number of tiles per block in the X direction. Alternatively, pre-defined values may be used for the number of tiles per block (e.g. 8×8 in the example of FIG. 1(a)), and the tile height and width may be more reliably calculated from the height and width of the row and the height and width of the column of black tiles.

In the illustrated examples, the configuration block and the special corner marker (the one that is different from the other three) are located at the top left corner of the 2d barcode. This is convenient because a printed document is typically scanned from left to right and top to bottom in a scanner with a flatbed or a document feeder. Alternatively, although less preferred, the special corner marker and the configuration block may be located in another corner, or the special corner marker and the configuration block may be located in different corners, so long as their relative locations and orientations are pre-defined by convention.

As shown FIG. 1(a), the 2d color barcode (including the corner markers and the block separator tiles) is surrounded on four sides by a white border having a width equal to the size of one tile (in the horizontal (X) and vertical (Y) directions). Thus, in this example, the total X (or Y) dimension of the 2d color barcode measured in the number of tiles is equal to the number of tiles per block in the X (or Y) direction multiplied by the number of blocks (including the configuration block) in the X (or Y) direction plus four. In the illustrated example, each data block contains 8×8 tiles. If each color tile encodes 4 bits of data, then each data block encodes 32 bytes of data. If the barcode is printed at 200 dpi resolution or embedded in a 200 dpi image, and each tile is 2 pixels (or dots) (in the X dimension) by 3 pixels (in the Y dimension) in size, then a barcode approximately 1" by 1" in size will contain 12×7-1 data blocks an encode 2656 bytes of data.

The configuration block specifies various parameters of the 2d color barcode, including:
(1) the number of color gradation values in red tiles
(2) the number of color gradation values in green tiles
(3) the number of color gradation values in blue tiles
(4) the number of data blocks in the X direction
(5) the number of data blocks in the Y direction
(6) metadata such as timestamp, error correction, color correction, etc.

In the example illustrated in FIG. 1(a), the number of color gradations in R, G and B range from 1 to 255 and are represented by the tiles labeled "R", "G" and "B", respectively, and the white tile (representing "1") in the top left corner. The number of data blocks in the X and Y directions also range from 1 to 255 and are represented by the tiles labeled "NUMXBLOK" and "NUMYBLOK". The metadata is represented by the tiles labeled "METADATA".

In the above illustrated example, the configuration information specifies the recoverable color gradation values by specifying the number of recoverable color gradation values in each color (R, G and B). The gradation values themselves are then determined by the decoder by dividing the entire range of gradations (e.g. 0 to 255) of each color into smaller gradation ranges based on the number of recoverable gradation values. This will enable the decoder to correctly recover the color gradations even when the scanner has a smaller color depth than the barcode renderer. Alternatively, the configuration information may explicitly specify the color gradation values used in the tiles, although this will likely take up more bits in the configuration block.

In one embodiment, all pixels of each color tile have the same color gradation value. In an alternative embodiment, each color tile includes a color portion the same color gradation value surrounded by a white (colorless) border. Such a white border enhances the recoverability of color tiles by reducing edge bleeding artifacts, which may arise from printer toner scatter and the CCD imaging process. Using a white border may require increased tile size. For example, if each tile has a color portion of 6×4 pixels, and the width of the white border is 1 pixel in the X direction and 2 pixels in the Y direction, the tile size is 8×8 pixels. If a white border is used for the color tiles, the widths of the white border (in the X and Y directions) are specified in the configuration block and utilized by the decoder to properly detect the color values of the tiles. Note that the white pixels can be provided on all four sides of a tile, or on two adjoining sides which has the same effect of separating the color portions of neighboring tiles.

In the embodiment described above, no limitation is placed on what color each color tile can have. In other words, each tile can have any one of the recoverable gradation values of any of the colors. In an alternative embodiment, the color for the tiles in the data blocks are arranged so that neighboring tiles (tiles sharing a common border) have different colors; i.e., no two red tiles, two green tile or two blue tiles can be next to each other. For example, the tiles can be arranged so that the tiles in the top row of each data block are R, G, B, R, G, B, . . . , the tiles in the second row are B, R, G, B, R, G . . . , the tiles in the third row are G, B, R, G, B, R, . . . etc., and each color tile can have any one of the recoverable gradation values of the specified color. This restriction reduces the data capacity of each tile, but enhances the recoverability of color tiles. This is because having different colors (R, G or B) in neighboring tiles makes it easier to determine where a tile begins and ends. If, on the other hand, two neighboring tiles of R=128 and R=250 are printed and scanned, portions of each tile may be imaged at a value closer to its neighboring tile. By restricting the neighboring tiles to be of different colors, the color gradation difference between neighboring tiles will be more pronounced.

It should be noted that although examples of a 2d color barcode are shown and described in detail here, the invention is not limited to such specific details.

Advantages of a 2d color barcode according to embodiments of the present invention include an increased data capacity and/or reduced physical size of the barcode, and reliable recovery of color gradation values.

Figure 2:
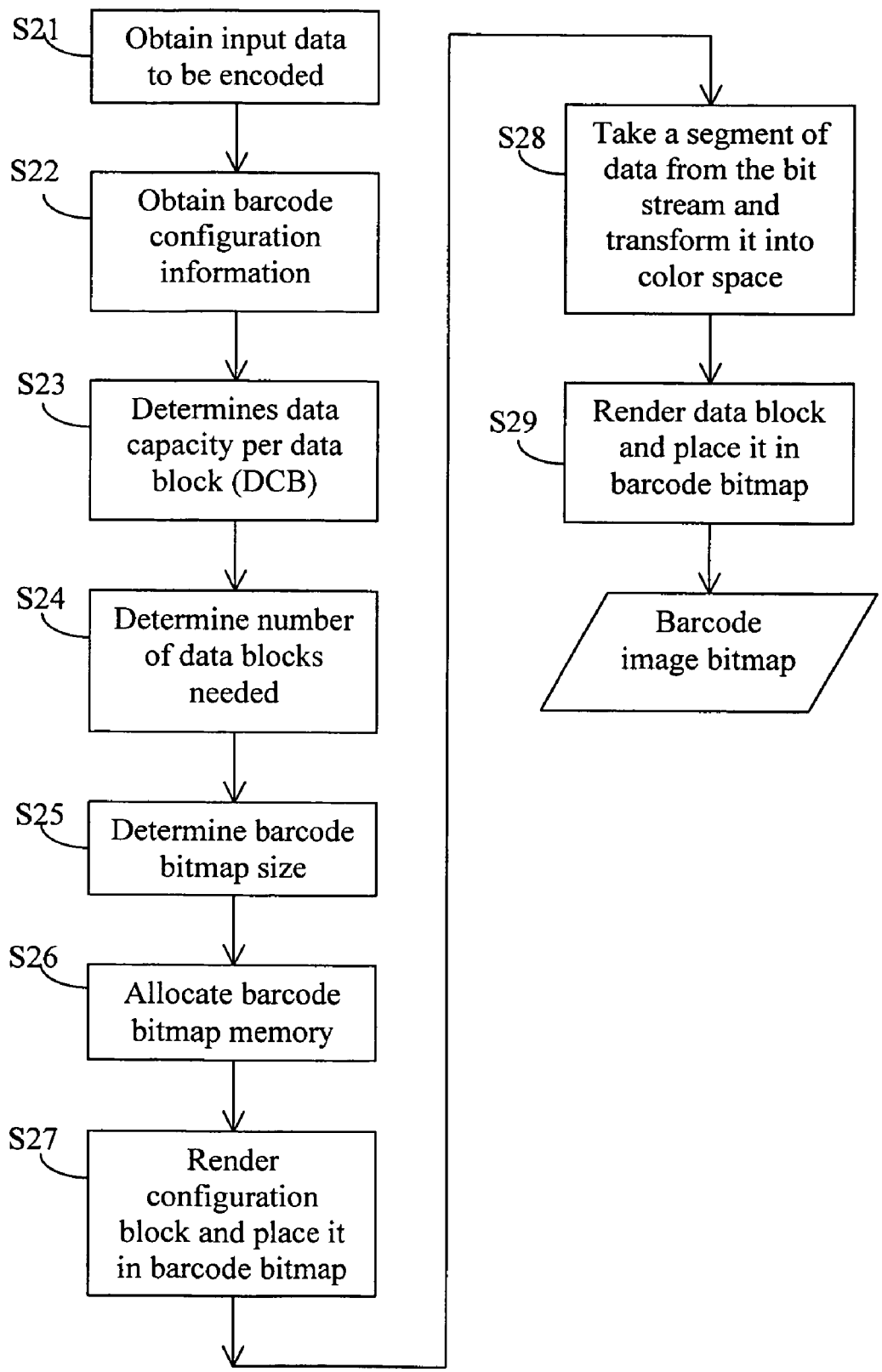
FIG. 2 is a flow chart showing a method for generating a 2d color barcode according to an embodiment of the present invention.
Figure 3:
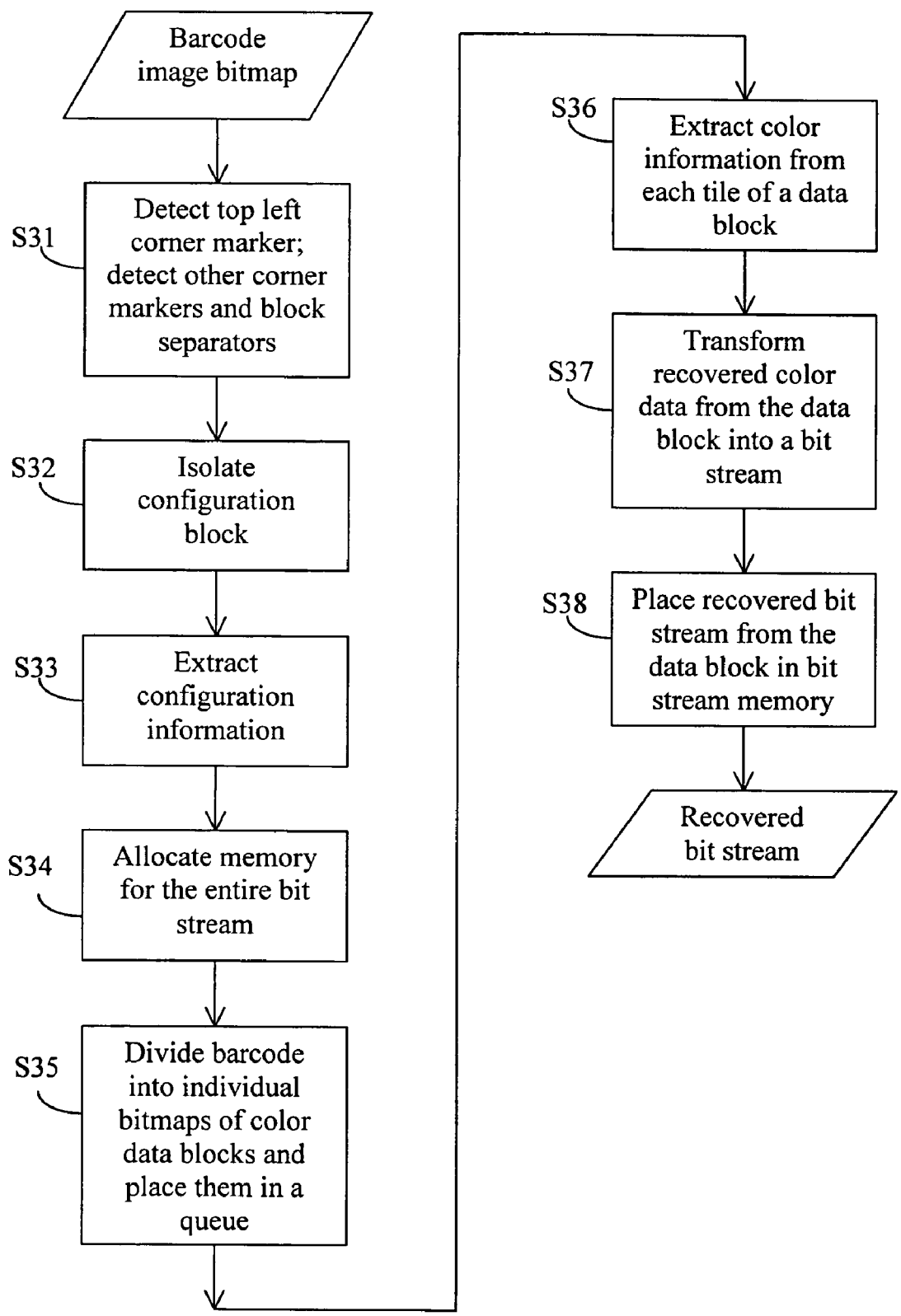
FIG. 3 is a flow chart showing a method for recovering data from a 2d color barcode according to an embodiment of the present invention.

FIGS. 2 and 3 illustrate a method for generating a 2d color barcode and a method for recovering the data coded in the 2d color barcode, respectively, according to embodiments of the present invention. The barcode creation and data recovery method may be respectively implemented in a data processing system which includes one or more processors and software executed by the processor(s). Note that the steps described and shown in FIGS. 2 and 3 do not have to be performed in the particular order shown in the drawings.

As shown in FIG. 2, in a 2d color barcode generating process, the data processing system obtains input data to be encoded in the form of a bit stream (step S21), as well as barcode configuration information including the numbers of recoverable color gradation values in the red, green and blue tiles, desirable metadata, etc. (step S22). The input data may originate from a variety of sources, such as a text document, am image, graphics, etc. and has been processed as desired such as compressed, encrypted, etc. Based on the configuration information, the system determines the data capacity per data block (DCB, in bits) of the color barcode (step S23). The system then determines the number of data blocks needed to encode the input data (step S24), and the number of blocks needed in the X and Y direction (NUMXBLOK and NUMYBLOK), which determines the barcode bitmap size (step S25). Note that if the number of data blocks needed plus the configuration block is less than NUMXBLOK×NUMYBLOK, dummy blocks (e.g., all white, all black, checker board, etc.) are used to fill up the space so that the 2d barcode is a rectangle. Steps S23-S25 are bit stream analysis steps which determine the 2d color barcode configuration.

Based on the determination in step S25, the system allocates the barcode bitmap memory for rendering the barcode (step S26). The system first renders the configuration block with black and white tiles and places it in the top left portion of the barcode bitmap (step S27). The configuration block encodes configuration information including the numbers of recoverable color gradation values in the red, green and blue tiles, the number of blocks in the X and Y directions, metadata, etc. Then, a segment of data is taken from the input bit stream and transformed into the color space (step S28). For example, if each color tile can encode 4 bits of data, then every 4 bits of the segment of data is transformed to a color gradation value for a tile. In the example described earlier where the barcode uses 4, 5 and 6 recoverable R, G and B gradations, respectively, the value 0 may be represented by white, the values 1-4 may be represented by four gradations of red, the values 5-9 may be represented by five gradations of green, and the values 10-15 may be represented by six gradations of blue. The length of the segment of data taken from the input bit stream is the data capacity per data block (DCB). Alternatively, each data block may include a block number, in which case the length of the segment of data taken from the input bit stream is DCB minus the number of bits used to specify the block number, and the block number bits are inserted at the beginning or end of the data segment. If the block numbers are omitted from the data blocks, the data blocks may be placed in the barcode in a pre-defined order so the decoder can decode the data blocks in that order. After transforming the data segment into color space, the system renders the data block and places it in the barcode bitmap (step S29). Steps S28 and S29 are repeated until all data in the input bit stream is encoded. Optionally, an end of data sequence may be encoded in the last data block to signal the end of the data. The barcode image bitmap rendered by the above process can be stored or printed.

A 2d color barcode data recovery method is described with reference to FIG. 3. First, a printed document is scanned to obtain a barcode image bitmap. The barcode is preferably scanned by a color scanning device having a flatbed or a document feeder, such as a scanner or a printer/copier/scanner multifunction machine. Alternatively, the barcode image bitmap may be obtained from a stored document. A data processing system (a decoder) first detects the top left corner marker of the barcode (step S31), which can be done by recognizing a pre-defined black tile pattern such as that shown in FIG. 1(c) and described earlier. Optionally, the other three corner markers and the block separators around the barcode are also detected. The system then isolates the configuration block, which is located at the top left corner abutting the top left corner marker and contains a known number of black and white tiles (such as 8×8 tiles) (step S32). As described earlier, the tile size and the number of tiles per block may be fixed values or may be determined by the encoder by analyzing the top left corner marker. The barcode configuration information encoded in the configuration block is extracted and decoded (step S33). The system allocates a bit stream memory for the entire bit stream (step S34).

Based on the configuration information, the barcode image bitmap is divided into individual bitmaps of color data blocks each containing a fixed number of tiles (such as 8×8 tiles), and the individual blocks are placed in a queue (step S35). The corner markers and the block separators may be used to aid in the division and increase its accuracy, e.g., to verify the start of the next data block. For each color data block in the queue, the color value is extracted from each tile (step S36). The color of each tile is determined by averaging the color values of all scanned pixels of the tile. The color data recovered from the data block is then transformed into a bit stream by converting each color value into a data value (step S37). If a block number has been added to the data block, the value is extracted and the bits representing it are removed from the bit stream. The bit stream recovered from the data block is then placed in the bit stream memory at a location determined either by the block number or the location of the data block in the barcode when block numbers are not used (step S38). Steps S36-S38 are repeated for each color data block until all data blocks are processed. The last data block can be detected by detecting a special end of data sequence in the data block.

In an alternative barcode data recovery method, a black and white scan of the barcode is first performed to extract the configuration data from the black and white configuration block. Based on the configuration data, the system determines whether the scanner has sufficient capability to read the color portion of the barcode. A color scan is then performed to extract the data encoded in the barcode. A similar determination step may also be included in the method shown in FIG. 3 after step S33.

The methods described above are implemented in a data processing system which includes a computer and a printer, a scanner and/or a multifunction machine connected to the computer. The methods are preferably implemented by software executed either by a processor in the printer, scanner and/or multifunction machine, or by the computer, or both. For example, a computer connected to a printer may execute a software program to generate the 2d color barcode and embed it in the document to be printed, and submit the document to the printer or the multifunction machine for printing. The actual printing can be is accomplished in any suitable manner. Similarly, scanning of the document may be accomplished by the scanner or multifunction machine in any suitable manner, and the computer connected to the scanner executes a software program to detect the color barcode and extract the encoded data.

Preferred embodiments of the present invention shown in FIGS. 1(a)-(e) use 2d barcode having rectangular tiles, but the invention may also apply to 2d barcodes having non-rectangular tiles.

It will be apparent to those skilled in the art that various modification and variations can be made in the selective image encoding and replacement method and apparatus of the present invention without departing from the spirit or scope of the invention. Thus, it is intended that the present invention cover modifications and variations that come within the scope of the appended claims and their equivalents.

What is claimed is:

1. A two-dimensional color barcode comprising:
   a configuration block containing a plurality of black and white tiles; and
   at least one data block containing a plurality of color tiles, each color tile having a color gradation value representing a data value, the color gradation value being one of a plurality of pre-defined recoverable color gradation values,
   wherein the configuration block encodes configuration information for the two-dimensional color barcode, the configuration information specifying the recoverable color gradation values used in the color tiles of the data block.

2. The two-dimensional color barcode of claim 1, wherein the configuration information further specifies a number of data blocks in a horizontal direction and a number of data blocks in a vertical direction of the barcode.

3. The two-dimensional color barcode of claim 1, wherein each color tile in the data block has a color gradation value of a red, green or blue color, and wherein the configuration information specifies a number of red color gradation values, a number of green color gradation values, and a number of blue color gradation values.

4. The two-dimensional color barcode of claim 1, wherein each color tile in the data block has a color gradation value of a cyan, magenta or yellow color, and wherein the configuration information specifies a number of cyan color gradation values, a number of magenta color gradation values, and a number of yellow color gradation values.

5. The two-dimensional color barcode of claim 1, wherein the configuration block is located in a corner of the barcode, and wherein the barcode further comprises a first corner marker abutting the configuration block.

6. The two-dimensional color barcode of claim 5, wherein the first corner marker includes a row and a column of black tiles.

7. The two-dimensional color barcode of claim 5, further comprising:
   three second corner markers located at the other three corners of the barcode; and
   a plurality of block separators located along one or more sides of the barcode.

8. The two-dimensional color barcode of claim 7, wherein each of the second corner markers and the block separators is a black tile.

9. The two-dimensional color barcode of claim 1, wherein each tile in the data block includes a color portion and a colorless border on at least two adjoining sides of the tile.

10. The two-dimensional color barcode of claim 1, wherein neighboring color tiles in the data block have different colors.

11. A method for generating a two-dimensional color barcode, comprising:
    (a) obtaining input data to be encoded in the two-dimensional color barcode;
    (b) obtaining configuration information specifying recoverable color gradation values for a plurality of colors to be used in the color barcode;
    (c) rendering a configuration block containing a plurality of black and white tiles, the configuration block encoding configuration information specifying the recoverable color gradation values; and
    (d) rendering at least one data block containing a plurality of color tiles, each color tile having a color gradation value representing a data value, the color gradation value being one of a plurality of the recoverable color gradation values.

12. The method of claim 11, further comprising:
    (e) determining, based on the configuration information, the data capacity of each data block; and
    (f) determining, based on the input data and the data capacity of each data block, the number of data blocks needed to encode the input data, a number of data blocks in a horizontal direction and a number of data blocks in a vertical direction of the barcode;
    wherein in step (c), the configuration block further encodes configuration information specifying the numbers of data blocks in the horizontal and vertical directions.

13. The method of claim 11, wherein each color tile in the data block has a color gradation value of a red, green or blue color, and wherein in step (c), the configuration information specifies a number of red color gradation values, a number of green color gradation values, and a number of blue color gradation values.

14. The method of claim 11, wherein each color tile in the data block has a color gradation value of a cyan, magenta or yellow color, and wherein in step (c), the configuration information specifies a number of cyan color gradation values, a number of magenta color gradation values, and a number of yellow color gradation values.

15. The method of claim 11, wherein the configuration block is located in a corner of the barcode, the method further comprising:
    (g) rendering a first corner marker abutting the configuration block.

16. The method of claim 15, wherein the first corner marker includes a row and a column of black tiles.

17. The method of claim 15, further comprising:
    (h) rendering three second corner markers located at the other three corners of the barcode; and
    (i) rendering a plurality of block separators located along one or more sides of the barcode.

18. The method of claim 17, wherein each of the second corner markers and the block separators is a black tile.

19. The method of claim 11, wherein each tile in the data block includes a color portion and a colorless border on at least two adjoining sides of the tile.

20. The method of claim 11, wherein neighboring color tiles in the data block have different colors.

21. A method for decoding a two-dimensional color barcode, the barcode comprising a configuration block containing a plurality of black and white tiles and at least one data block containing a plurality of color tiles, each color tile having a color gradation value representing a data value, the color gradation value being one of a plurality of pre-defined recoverable color gradation values, wherein the configuration block encodes configuration information for the two-dimensional color barcode, the configuration information specifying the recoverable color gradation values used in the color tiles of the data block, the configuration information further specifying a number of data blocks in a horizontal direction and a number of data blocks in a vertical direction of the barcode, the method comprising:
    (a) isolating the configuration block and extracting configuration information from the configuration block;
    (b) based on the configuration information, dividing the barcode into a plurality of data blocks; and
    (c) based on the configuration information, determine color gradation values of the color tiles of the data blocks and decoding the color gradation values to obtain data encoded in the data blocks.

22. The method of claim 21, wherein each color tile in the data block has a color gradation value of a red, green or blue color, and wherein the configuration information specifies a number of red color gradation values, a number of green color gradation values, and a number of blue color gradation values.

23. The method of claim 21, wherein each color tile in the data block has a color gradation value of a cyan, magenta or yellow color, and wherein the configuration information specifies a number of cyan color gradation values, a number of magenta color gradation values, and a number of yellow color gradation values.

24. The method of claim 21, wherein the configuration block is located in a corner of the barcode, and wherein the barcode further comprises a first corner marker abutting the configuration block and including a row and a column of black tiles, the method further comprising:
    (d) detecting the column and row of black tiles of the first corner marker to locate the configuration block.

25. The method of claim 24, further comprising:
    (e) determining the tile size and the number of tiles per block from the detected column and row of black tiles of the first corner marker.

26. The method of claim 24, wherein the barcode further comprises three second corner markers located at the other three corners of the barcode and a plurality of block separators located along one or more sides of the barcode, each of the second corner markers and the block separators being a black tile, the method further comprising:
    (f) detecting the second corner markers and the block separators.

27. A computer program product comprising a computer usable medium having a computer readable code embodied therein for controlling a data processing system, the computer readable program code configured to cause the data processing system to execute a process for generating a two-dimensional color barcode comprising the steps of:
    (a) obtaining input data to be encoded in the two-dimensional color barcode;
    (b) obtaining configuration information specifying recoverable color gradation values for a plurality of colors to be used in the color barcode;
    (c) rendering a configuration block containing a plurality of black and white tiles, the configuration block encoding configuration information specifying the recoverable color gradation values; and
    (d) rendering at least one data block containing a plurality of color tiles, each color tile having a color gradation value representing a data value, the color gradation value being one of a plurality of the recoverable color gradation values.

28. A computer program product comprising a computer usable medium having a computer readable code embodied therein for controlling a data processing system, the computer readable program code configured to cause the data processing system to execute a process for decoding a two-dimensional color barcode, the barcode comprising a configuration block containing a plurality of black and white tiles and at least one data block containing a plurality of color tiles, each color tile having a color gradation value representing a data value, the color gradation value being one of a plurality of pre-defined recoverable color gradation values, wherein the configuration block encodes configuration information for the two-dimensional color barcode, the configuration information specifying the recoverable color gradation values used in the color tiles of the data block, the configuration information further specifying a number of data blocks in a horizontal direction and a number of data blocks in a vertical direction of the barcode, the process comprising the steps of:

(a) isolating the configuration block and extract configuration information from the configuration block;
(b) based on the configuration information, dividing the barcode into a plurality of data blocks; and
(c) based on the configuration information, determine color gradation values of the color tiles of the data blocks and decoding the color gradation values to obtain data encoded in the data blocks.

* * * * *